United States Patent [19]
Howlett et al.

[11] Patent Number: 4,718,507
[45] Date of Patent: Jan. 12, 1988

[54] ELECTRONIC SCALE AND LENGTH MEASUREMENT APPARATUS INCLUDING A DIGITAL READOUT

[75] Inventors: Clyde W. Howlett, 544 S. Hebron, Evansville, Ind. 47715; David E. Mitchell, Poseyville, Ind.

[73] Assignee: Clyde W. Howlett, Evansville, Ind.

[21] Appl. No.: 903,596

[22] Filed: Sep. 4, 1986

[51] Int. Cl.$^4$ ............................ G01G 3/14; G01G 3/08
[52] U.S. Cl. ................................. 177/210 FP; 177/229
[58] Field of Search ................ 177/210 EM, 210 FP, 177/229; 73/580

[56] References Cited
U.S. PATENT DOCUMENTS

| | | |
|---|---|---|
| 2,458,811 | 1/1949 | Koscieiski . |
| 2,570,538 | 4/1949 | Fincher et al. . |
| 2,750,184 | 6/1956 | Warndahl . |
| 3,684,875 | 8/1972 | Smith . |
| 4,362,219 | 12/1982 | Carlsson . |
| 4,405,024 | 9/1983 | Fraval et al. ............. 177/210 FP X |
| 4,405,025 | 9/1983 | Yanagita et al. ............. 177/210 FP |
| 4,429,574 | 2/1984 | Barry et al. ............. 177/210 FP X |
| 4,458,770 | 7/1984 | Bucci . |
| 4,503,922 | 3/1985 | Brosh et al. ............. 177/210 FP X |
| 4,561,512 | 12/1985 | Tramposch . |

Primary Examiner—George H. Miller, Jr.
Attorney, Agent, or Firm—Jeffers, Hoffman & Niewyk

[57] ABSTRACT

An electronic scale and length measurement apparatus including an electric transducer for providing an electrical signal indicative of the weight of an object to be measured and an electronic length measurement transducer for providing an electrical signal indicative of the length of an object to be measured. These signals are processed by an electronic signal processing circuit including a microprocessor and a ROM. The microprocessor derives values indicative of the weight and the length of an object to be measured which are then alternatively displayed on a liquid crystal display. The weight measurement transducer comprises a deflecting beam and a coil which is part of an oscillator circuit. Calibration of the device may be effected by means of a variable position aluminum disc connected to the deflecting beam for varying the apparent inductance of the coil. The length signal is provided by means of a pair of LED's, an apertured tape, and a pair of photocells. The apparatus also includes a store and recall function, a conversion subroutine for converting measured values into either English or metric units.

6 Claims, 9 Drawing Figures

ELECTRONIC SCALE AND LENGTH MEASUREMENT APPARATUS INCLUDING A DIGITAL READOUT

BACKGROUND OF THE INVENTION

This invention relates to an electronic apparatus which can both measure weight and length of an object. More specifically, the invention relates to a battery-operated, hand held electronic apparatus which may be used to measure the weight and the length of a fish and which includes a digital readout to display the measured values. While, in the illustrated embodiment set forth in this disclosure, the apparatus is illustrated for weighing and measuring a fish, it should be understood that the apparatus is general in nature and may be used to measure the weight and/or length of other objects.

Prior art devices have been available for determining the weight of objects, such as a fish. These devices have generally been mechanical in nature and generally comprise a tension spring having a hook secured to one end thereof and having the other end thereof secured to an index finger. The spring will be extended as a function of the weight suspended from the hook so that the index finger slides along a linear scale to provide a readout value of the weight of the suspended object. Additionally, some of these prior art scales include a measuring tape whereby the length of a fish or other object suspended from the hook may be measured.

A disadvantage of these prior art apparatuses is that, due to the non-linear deflection of the spring, the weight cannot generally be determined accurately. Furthermore, the readout devices are generally quite compact so that the resolution of the apparatus is poor whereby small differences in weight between different objects are not easily measured or detected. Another disadvantage of these devices is that they have no memory so that the weight or length of a previously measured object is not recorded and can only be recalled by memory or by keeping a written record of the measurements. A still further disadvantage of these devices is that the readouts are analog based rather than digital so that the exact value of either the length or the weight of an object can only be approximated.

Prior art electronic weighing scales have also been provided. These scales are generally relatively complex and cumbersome so that they cannot be hand held and are not easily portable. Lastly, these devices generally do not include structure to both measure the weight and the length of an object nor structure to convert the indicated values from metric units to English units or vice versa. Such electronic scales are also subject to drift because of variations in ambient temperatures and aging of components and must, therefore, be calibrated before use.

It is, therefore, desired to provide an accurate electronic, hand-held, scale and length measurement apparatus, which includes a digital readout and a memory wherein previously read measurements may be stored from which they may be recalled, which can provide a readout in both metric and English units and which is automatically calibrated when power is applied to the unit.

SUMMARY OF THE INVENTION

The present invention overcomes the disadvantages of the above-described prior art apparatuses for measuring weight and length by providing an improved apparatus therefor.

The present invention, in one form thereof, provides an electronic weight and length measurement device including a digital readout. The device incorporates a microprocessor and a read-only memory (ROM) as well as a liquid crystal display (LCD). An electrical transducer is provided including a cantilevered beam which deflects in proportion to the weight of an object suspended therefrom. This deflection generates an electrical signal which is converted by the microprocessor to a digital value displayed on the LCD. Similarly, the length of an object is measured by means of an apertured tape which is pulled out to a length corresponding to the length of the object to be measured. A pair of light emitting diodes (LED's) and photocells provide a plurality of electronic pulses as a function of the length. The pulses are counted by the microprocessor and the count is converted to a digital value indicative of the length of the device; which value is displayed on the LCD.

The present invention, in one form thereof, further comprises an electronic, digital, hand-held weight and length measurement apparatus including a microprocessor, a read-only memory (ROM), and a liquid crystal display (LCD). The weight is measured by means of a transducer comprising a cantilevered beam having a hook secured thereto. An electrical coil is located in proximity to the beam. Fine adjustment for calibrating the device is accomplished by of an aluminum disc whose rest position with respect to the coil may be varied. Thus, when an object to be weighed is suspended from the hook, the beam deflects an amount which varies as a function of the weight of the object. The amount of deflection, including the amount of movement of the aluminum disc, results in a change in the effective inductance of the electrical coil. The coil is connected in an electronic circuit which generates an oscillating signal. Thus, depending upon the weight of the object and the resultant amount of deflection of the beam as well as the calibrated rest position of the aluminum disc, the frequency of the oscillator is varied as a function of the weight of the object to be measured. The apparatus only detects the actual change in frequency from the time when the apparatus is turned on to the time when the object is suspended from the hook so that the drift of the electronic circuitry components and the resultant shift in frequency of the oscillator will not adversely affect the accuracy of the measurement. The microprocessor, by means of a predetermined program stored in the ROM, determines the weight of the object which is then displayed on the LCD. The apparatus also includes a store and recall button whereby the measured weight may be stored in a memory and recalled.

The apparatus according to the present invention, in one form thereof, may also be used to measure the length of an object by means of a tape which includes a plurality of apertures therein. The apertured tape moves past a pair of light emitting diodes (LED's) and a pair of photocells whereby a series of electrical pulses are generated by the photocells. A program stored in the ROM causes the pulse to be counted by incrementing the count when the tape is pulled out and decrementing when the tape is retracted. Therefore, the count accumulated in the microprocessor may be converted to a value indicative of the length of the object to be measured which is displayed on the LCD display. The apparatus also includes a metric or English conversion program stored in the ROM and an actuating device whereby the readout may be provided in either metric or English units.

One advantage of the apparatus according to the instant invention is that the apparatus is very compact.

Another advantage of the apparatus according to the instant invention is that it is very accurate and that accurate calibration of the device may be obtained.

Still another advantage of the apparatus according to the instant invention is that the apparatus includes a memory whereby previously measured weights and lengths may be stored and recalled.

Yet another advantage of the apparatus according to the instant invention is that a digital readout is provided which is more easy to read than the prior art analog readouts.

A further advantage of the apparatus according to the instant invention is that the readout values may be given in both English and metric units.

A still further advantage of the apparatus according to the instant invention is that the apparatus does not need calibration at the initiation of each new measurement as the weight measurement algorithm uses the current frequency of the oscillator as a reference whereby the measurement process is not subject to electronic drift.

A yet further advantage of the apparatus according to the instant invention is that, by means of the store and recall structure, the difference in weight and length of an object as compared to a previously measured object may be determined.

The present invention, in one form thereof, comprises an apparatus for measuring the weight and the length of an object. The apparatus includes a hook for supporting an object and a transducer for providing a first electrical signal indicative of the weight of the object supported by the hook. A second transducer is provided for generating a second electrical signal which is indicative of the length of the object supported by the hook. An electronic processing circuit is provided for processing the weight and length electrical signals, for selecting for display either the weight or length signal and for providing an output signal corresponding to the selected signal. An LCD is provided to display a digital value which is proportional to the selected signal.

The present invention, in one form thereof, further provides an electronic weighing scale including a calibration device and a support for supporting an object to be weighed. A deflecting beam is connected to the supporting device for deflecting proportionately to the weight of the supported object. An electrical coil is mounted in proximity to the deflecting beam and an electrical circuit is connected to the coil and is operative to provide an oscillating signal whose frequency varies as a function of the deflection of the deflecting device. The calibration device is located adjacent to the coil and is movable relative thereto to vary the frequency of the oscillating signal as a function of the position of the calibrating device relative to the coil.

The present invention, in one form thereof, comprises a method for providing an indication of the length and weight of an object with an electronic weighing and measuring scale. The scale includes a transducer including a support for supporting an object and an electrical oscillator, whose frequency may be varied by the transducer as a function of the weight of the supported object. The scale also includes a length measurement transducer for generating an electrical signal which is a function of the length of the supported object. The apparatus further includes an electronic signal processing circuit including a memory, a microprocessor, a store/recall switch and a digital display. The method comprises the steps of first supplying electrical power to the scale, storing in the memory a first value corresponding to the initial frequency of the oscillator, supporting the object on the supporting device, storing a second value corresponding to the electrical oscillating frequency which has been changed by the weight transducer; computing the difference between the first and second frequency values; computing a weight value as a function of the frequency difference; and displaying a value on the digital display corresponding to the weight value.

It is an object of present invention to provide an electronic measurement apparatus for measuring the weight and/or length of an object.

A further object of the present invention is to provide an electronic weight and length measurement apparatus which provides an accurate indication of the weight and length of an object.

Another object of the present invention is to provide a weight and length measurement apparatus which includes a memory in which a previously determined weight value and/or length value may be stored and from which the stored values may be recalled.

Yet another object of the present invention is to provide a very compact weight and length measurement apparatus.

A further object of the present invention is to provide a weight and length measurement apparatus which displays the measured values in digital form.

A still further object of the present invention is to provide an electronic weight and length measurement apparatus which can provide readout values in both English and metric units.

Still another object of the present invention is to provide an apparatus which does not need to be zeroed or calibrated at the initiation of each new measurement but which is self-zeroing.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying drawings wherein.

Corresponding reference characters indicate corresponding parts throughout the several views of the drawings.

The exemplification set out herein illustrates a preferred embodiment of the invention, in one form thereof, and such exemplification is not to be construed as limiting the scope of the disclosure or the scope of the invention in any manner.

DESCRIPTION OF THE PREFERRED EMBODIMENT

Figure 1:
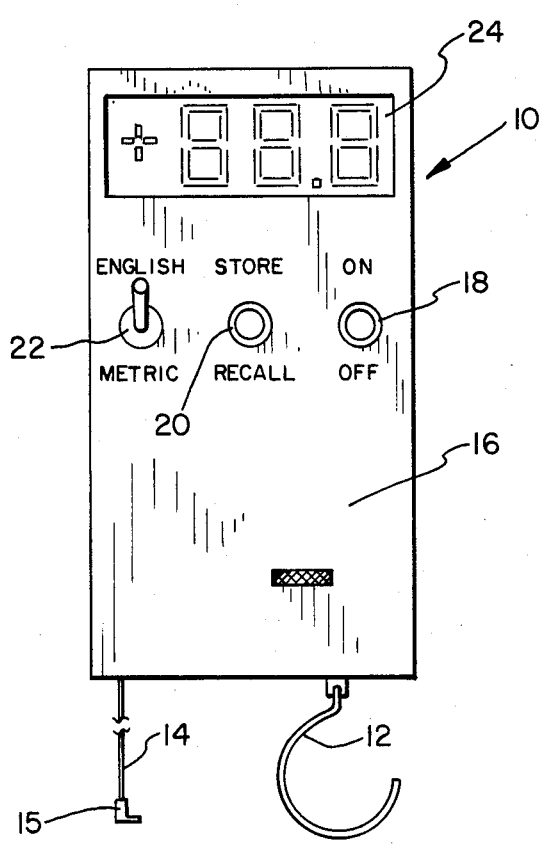
FIG. 1 is a front elevational view of an apparatus incorporating a preferred embodiment of the present invention.

Referring to FIG. 1, there is shown a front elevational view of the weight and length measurement apparatus 10 which includes a hook 12 for suspending an object to be weighed therefrom such as, for instance, a fish. It should be understood that the apparatus is general in nature and may be used to measure the weight and length of a variety of objects. A retractable tape 14 is provided with a pull tab 15 whereby the tape 14 may be pulled out from the apparatus for measuring an object. The tape may be retracted by a spring biased reel as is conventional. The front face 16 of the apparatus includes an on/off switch 18, a store and recall switch 20, and an English and metric conversion selection switch 22. Furthermore, the front face includes a digital readout 24 comprising a liquid crystal display (LCD). The details of the construction of the LCD are well known in the prior art and form no part of the present invention.

Figure 3:
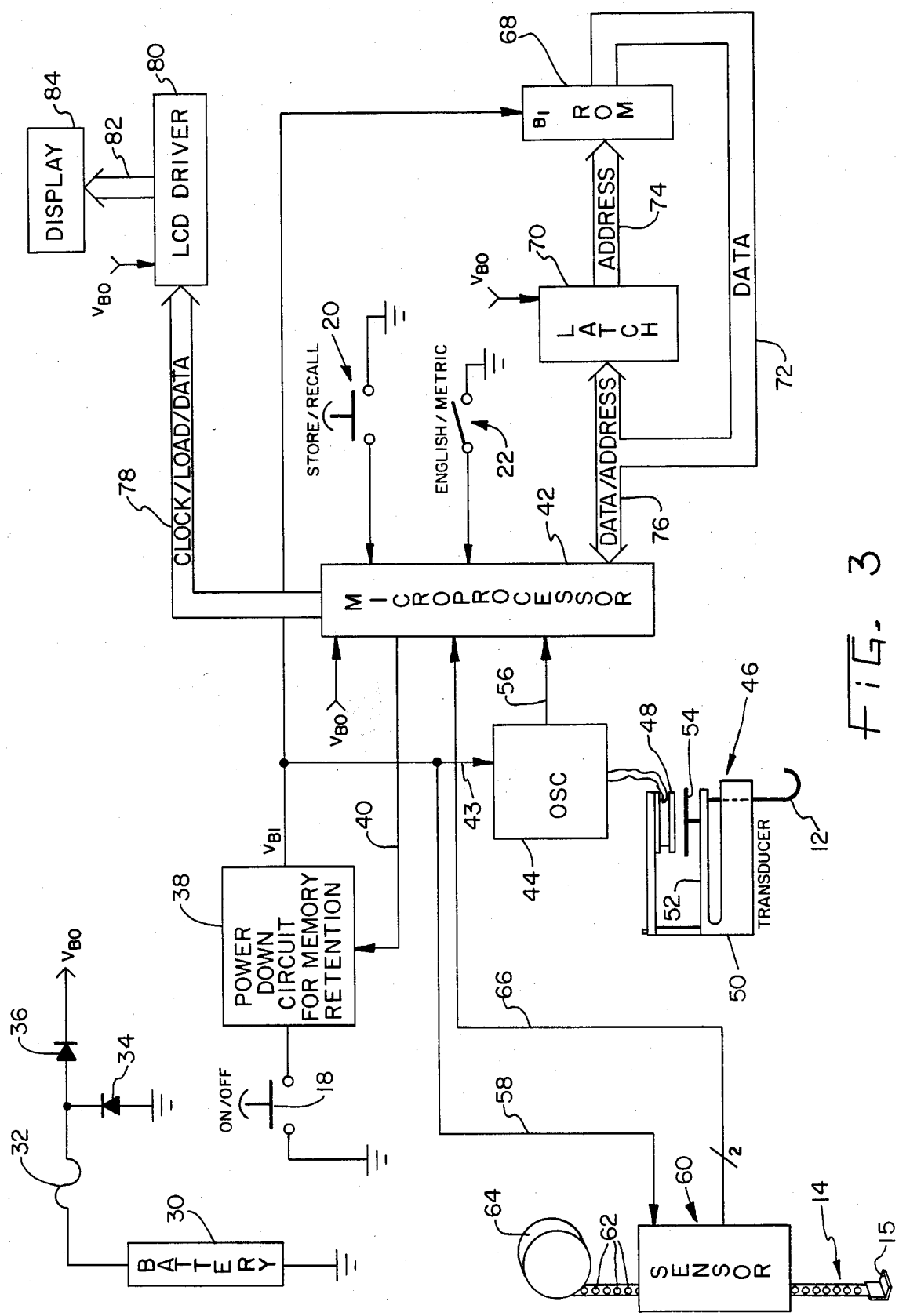
FIG. 3 is a schematic block diagram of the electrical circuit for the apparatus of FIG. 1.

Referring now to FIG. 3, there is shown a schematic block diagram of the electrical system for the operation of the apparatus. The apparatus is powered by a battery 30, as shown in the top left-hand corner of the schematic. Battery 30 may comprise one or more batteries connected in series, as is conventional in hand-held, battery-operated devices. A fuse 32 is also shown as well as a pair of blocking diodes 34 and 36 to provide a DC supply voltage VB0 for the apparatus. A more detailed representation of the power supply is shown in FIG. 4a and will be further discussed hereinbelow.

The circuit also includes a spring biased momentary on/off switch 18 which is connected to ground and which, when depressed, will cause the power down circuit 38 to turn on the apparatus. The power down circuit 38 includes an input 40 from microprocessor 42 whereby, when on/off switch 18 is momentarily held down, the microprocessor will cause a latching circuit to be established through power down circuit 38 whereby the unit will be supplied with power for a predetermined amount of time such as, for instance, two minutes. The power down circuit 38 also provides power to an oscillator 44 and to length measurement transducer 60. Oscillator 44 is connected to a weight measurement transducer 46 including an electrical coil 48 which is rigidly attached to a frame 50 and which is in circuit with oscillator 44. A cantilevered beam 52 has the hook 12 connected thereto whereby, when an object is suspended from hook 12, beam 52 will deflect, whereby a metal disc 54, which is securely connected to beam 52, will move with respect to coil 48. The apparent inductance of coil 48 is thereby varied, as further explained hereinbelow, whereby the frequency of the oscillator 44 will be varied as a function of the deflection of beam 52 and disc 54. The output frequency of oscillator 44 is supplied to microprocessor 42 by means of input 56.

A length measurement transducer 60 including tape 14 which has a plurality of apertures 62 therein, is connected to power down circuit 38 by means of an input line 58. Tape 14 also includes a tab 15 whereby the tape may be pulled out from a reel 64 wherein the coil is normally contained and into which tape 14 may be retracted by means of a spring (not shown), as is conventional. The output from transducer 60 is provided by means of two output lines, shown in FIG. 3 as a single line 66, to microprocessor 42. Microprocessor 42 communicates, by conventional multiplexing techniques, with a read-only memory (ROM) 68 and a latch or demultiplexing unit 70 by means of busses 72, 74, and 76. Input power to ROM 68 is provided by means of power down circuit 38. Input power to the demultiplexer or latch 70 is provided directly from the VB0 power supply. Store recall switch 20 and English/metric unit selection switch 22 also provide inputs to microprocessor 42. Output data from microprocessor 42 is routed via bus 78 to liquid crystal display (LCD) driver 80 which is powered from the VB0 power supply. Output from LCD driver 80 is provided by means of bus 82 to LCD display 84.

Figure 4A:
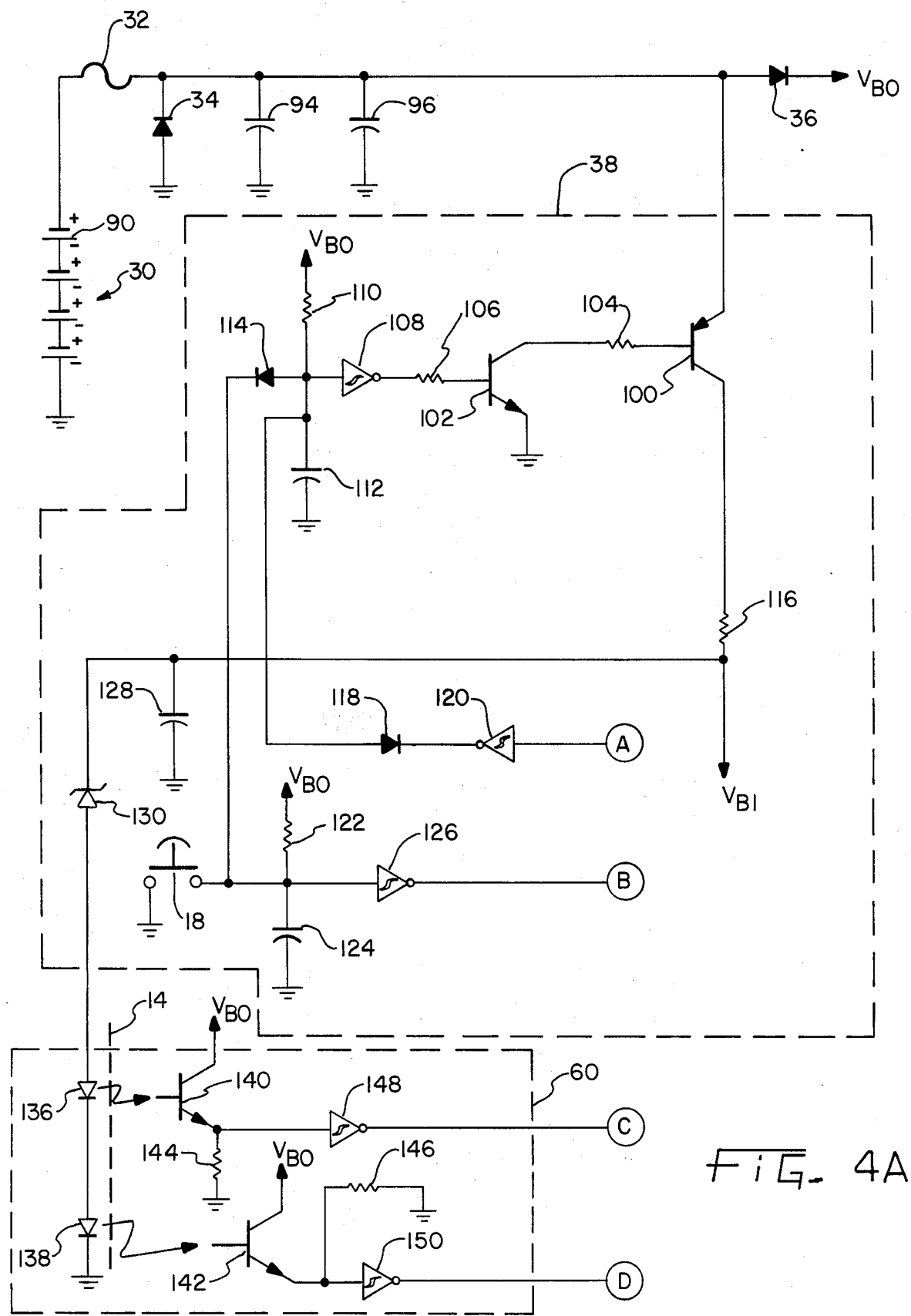
FIGS. 4a and 4b are schematic electrical diagrams of the circuit for the apparatus of FIG. 1.
Figure 4B:
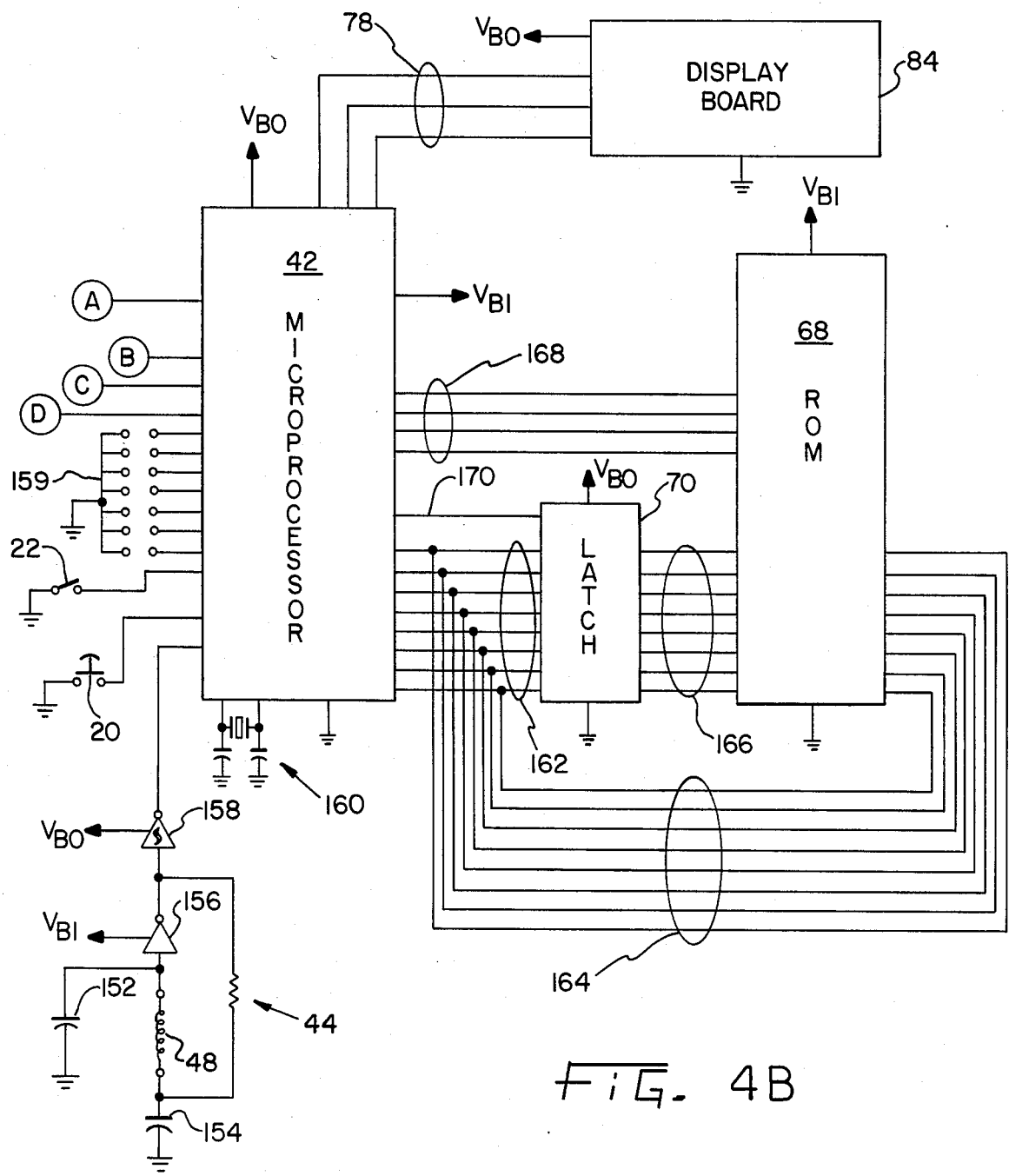
Figure 7A:
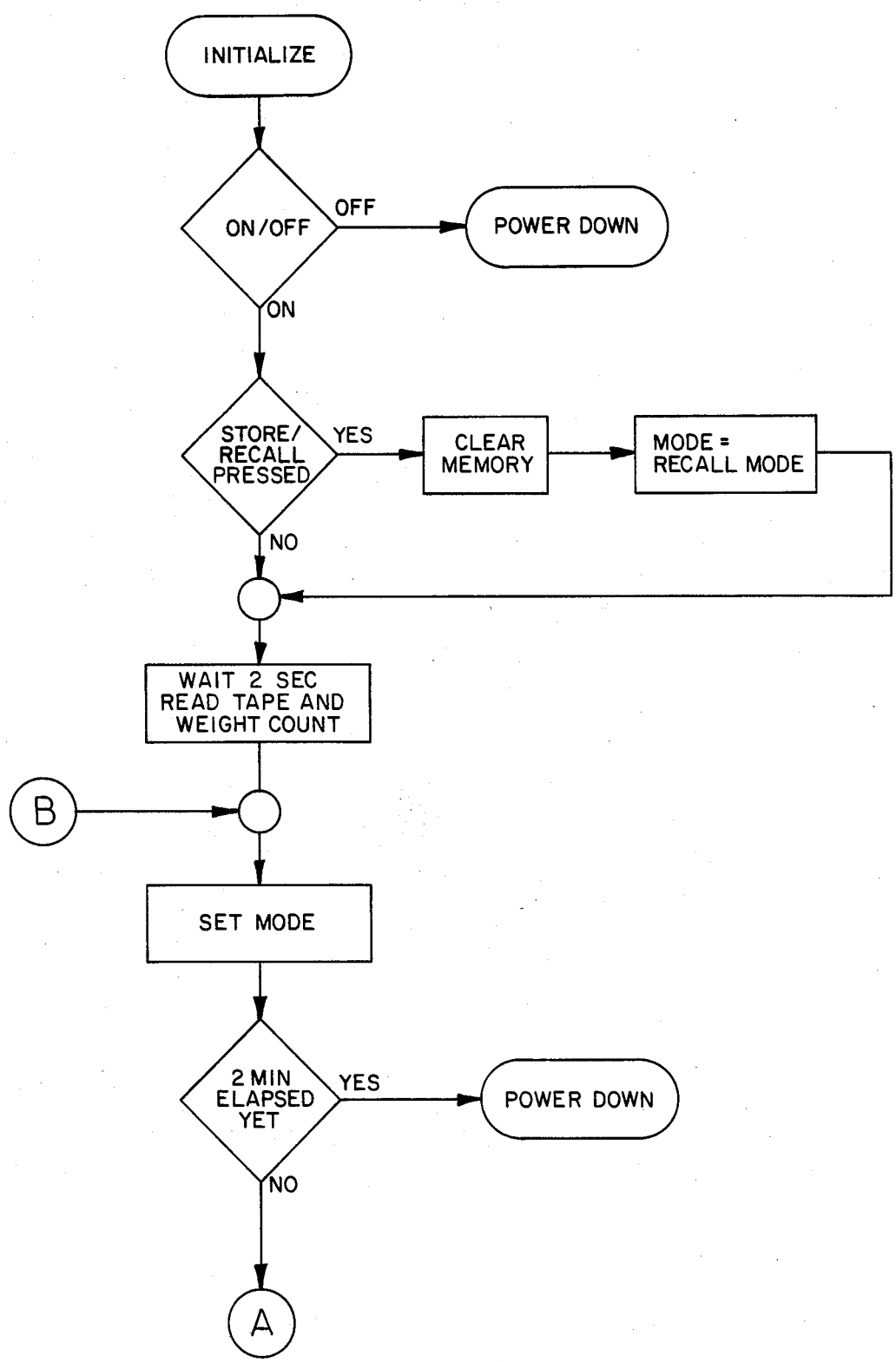
FIGS. 7a and 7b are flow charts for the operation of the apparatus of FIG. 1.
Figure 7B:
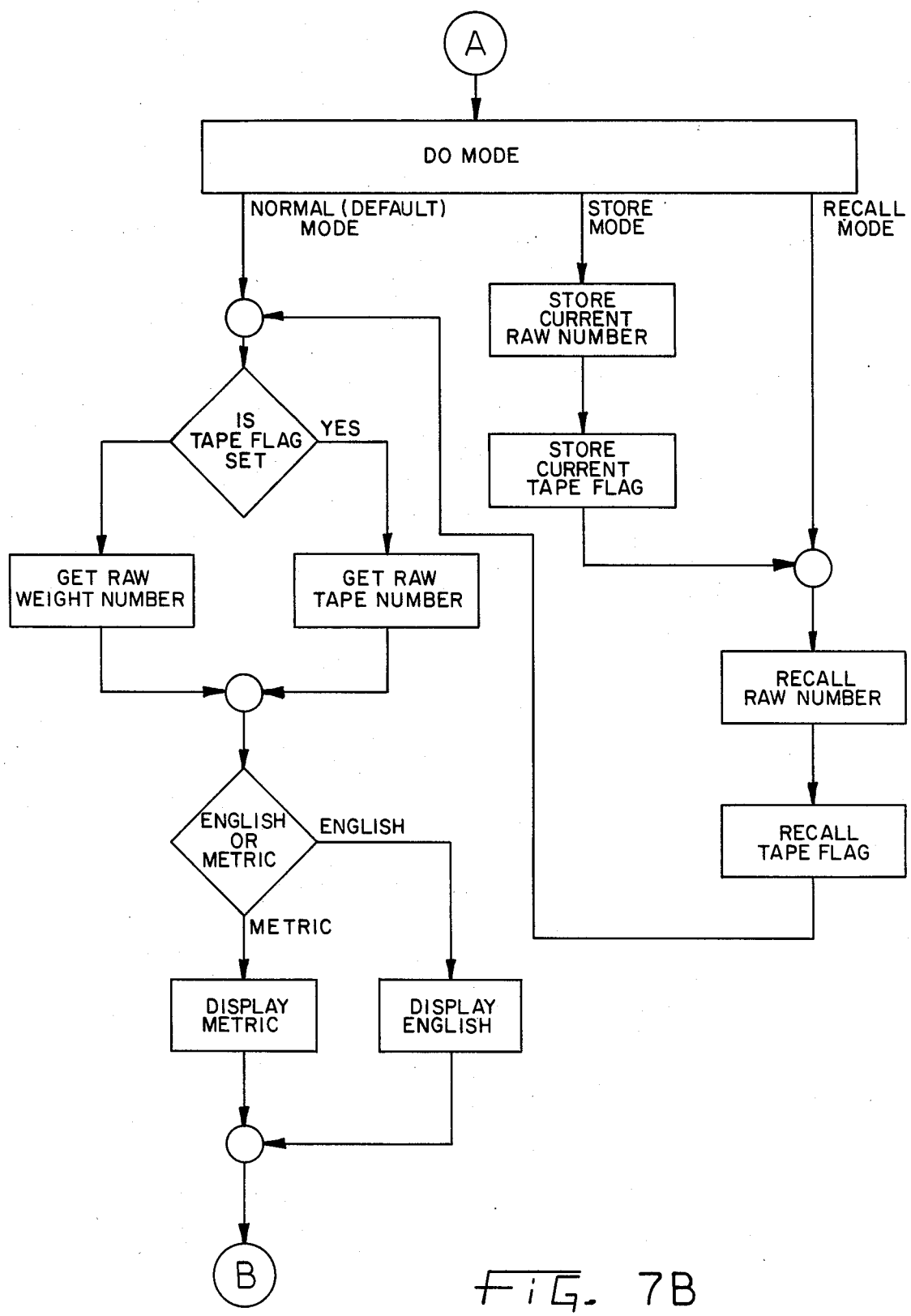

Referring now to FIGS. 4a and 4b, the power supply includes batteries 30 comprising four one and one half (1½) volt batteries connected in series to generate 6 volts. It should be noted, of course, that the battery input voltage is a matter of design choice and may be varied, as desired. Battery power is supplied via fuse 32, blocking diodes 34 and 36 and filter capacitors 94 and 96, to the emitter of a PNP transistor 100. The base of transistor 100 is supplied via a resistor 104 from the collector of an NPN transistor 102. The base of NPN transistor 102 is supplied via a resistor 106 and a Schmitt trigger 108 from power supply VB0 via a resistor 110. A capacitor 112 is also shown connected to ground from the input to the Schmitt trigger 108 to generate a suitable time delay for power down circuit 38 when the apparatus is first energized. On/off switch 18 is connected via an isolating diode 114 to the input of Schmitt trigger 108. As is well known, Schmitt triggers are inverters so that, when a high voltage input is supplied at the input, a low voltage is produced at the output. Therefore, since the input of Schmitt trigger 108 is normally supplied with voltage from the VB0 supply, the output of Schmitt trigger 108 will be low thereby keeping transistor 102 turned off which in turn keeps transistor 100 turned off. Therefore, voltage VB1, at the collector of transistor 100, is normally low.

However, when switch 18 is momentarily closed, capacitor 124 will be grounded and will discharge so that the input to Schmitt trigger 126 will go low. The output of Schmitt trigger 126 will, therefore, go high which supplies a high voltage signal to an input B of microprocessor 42. At the same time, closed on/off switch 18 has grounded and discharged capacitor 112 via diode 114. Therefore, the input of Schmitt trigger 108 will be low and the output of Schmitt trigger 108 will now be high, thereby turning on transistors 102 and 100 and supplying VB1 voltage to the collector of transmitter 100. The VB1 voltage will, therefore, power up the desired components of the system, for instance, ROM 68, microprocessor 42, oscillator 44, and length measurement transducer 14 as further explained hereinafter. When the operator releases spring biased on/off switch 18, it will take a predetermined amount of time for the voltage supply VB0 to charge up capacitor 112 through resistor 110 and capacitor 124 through resistor 122. Therefore, and because there is some built in hysteresis in Schmitt trigger 126, the output of Schmitt trigger 126 will remain high for a predetermined amount of time. The time constant of resistor 110 and capacitor 112 is greater than the time constant of resistor 122 and capacitor 124. Therefore, even though drive disappears from input B of microprocessor 42, the output of Schmitt trigger 108 will remain high and VB1 will remain on long enough for the microprocessor to begin executing several software program instructions stored in ROM 68. One of the instructions which microprocessor 42 will execute is to latch the power VB1 on by providing a high output on microprocessor 42, output A. Thus, microprocessor 42, by means of the software instructions stored in ROM 68, will produce a high output signal on output A which is supplied to the input terminal of Schmitt trigger 120. The high input of Schmitt trigger 120 will cause the output of Schmitt trigger 120 to go low, thereby grounding capacitor 112 via diode 118 and thereby latching transistors 100 and 102 into the on condition and causing a continuous supply of voltage VB1 to appear at the cathode of transistor 100 as long as the output signal on terminal A is high. Therefore, the power supply voltage VB1 is latched on for a predetermined amount of time as determined by the software instruction in ROM 68. The microprocessor 42, after the predetermined programmed period, will generate an instruction which removes the high output from the input of Schmitt trigger 120 and causes VB1 to be turned off. In other words, apparatus 10, once it has been turned on by an operator by the momentary depression of switch 18, will stay on for a predetermined amount of time as programmed into the ROM, such as, for instance, two minutes. At the end of this period, VB1 power will go off and the apparatus will be in the standby mode, thus conserving battery power.

VB1 voltage is also supplied via Zener diode 130 and filter capacitor 128 to a pair of (LED's) 136 and 138. As an alternative to using Zener diode 130, several rectifier diodes, connected in series, may also be used. The LED's are optically coupled to a pair of photocells 140 and 142 whereby the light from LED's 136 and 138 will alternately be permitted and prevented from impinging on photocells 140 and 142 by means of the apertures 62 in tape 14 as the tape is moved past LED's 136 and 138 as explained hereinabove. The outputs of photocells 140 and 142 are supplied respectively to the inputs of Schmitt triggers 148 and 150 whose outputs are supplied to microprocessor 42 as shown.

Referring further to FIG. 4b, weight transducer 44 is shown as comprising a coil 48, two capacitors 152, 154 and an inverter 156. As explained hereinafter, the frequency of the oscillator 44 may be varied by means of transducer 46. The oscillator will begin to operate as soon as VB1 power is supplied to inverter 156 when on/off switch 18 is depressed. The output pulses of the oscillator are squared up by means of Schmitt trigger 158 so that a train of square pulses at a frequency of oscillator 44 is supplied to the input of microprocessor 42. Microprocessor 42 is connected to a crystal oscillator 160 which performs the clocking functions of microprocessor 42. Microprocessor 42 is also connected via a multiplexed data bus 170 to a latch or demultiplexer 70 whereby ROM 68 is addressed on its address lines. The output pins of microprocessor 42 which are connected to latch 70 are both data input and address pins. Thus, latch 70 demultiplexes the multiplexed address and data information on lines 162. The operation of demultiplexer 170 and its interconnection in a multiplexed circuit is well known in the prior art and need not be further explained herein. Bus 164 connects ROM 68 to microprocessor 42 and bus 166 connects to ROM 68 to latch 70. Latch 70 is strobed by a signal from the microprocessor 42 on line 170. Thus, when output lines 162 have an address thereon, an instruction is issued by a strobe input 170 to the latch to receive the address. The ROM 68 will then provide data on its output lines 164 which is fed back to the microprocessor 42. Furthermore, address bus 168 also connects ROM 68 directly with microprocessor 42. It should be noted that microprocessor 42, latch 70, and ROM 68 could be manufactured as a single chip and as a processor with an internal memory. The output of microprocessor 42 is fed to a display board 84 comprising an LCD driver 80 and an LCD 84.

Typical components for the construction of the circuit shown in FIGS. 4a and 4b are as follows:
  microprocessor 42: 80C31
  latch 70: CD4508
  ROM 68: 27C16
  Schmitt triggers 158, 108, 120, 126, 148, and 150: 4584
  inverter 156: 4049
  diodes 92, 98, and 118: 1N914
  transistor 100: 2N2222
  transistor 101: 2N2907
  transistor 102: 2N2222

Figure 2:
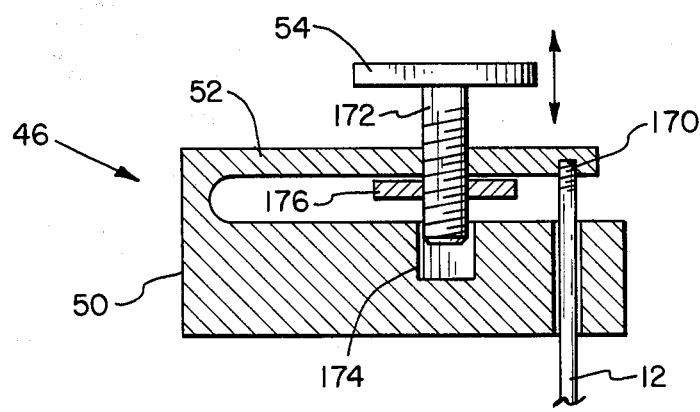
FIG. 2 is a front elevational view of the transducer of the apparatus of FIG. 1 for detecting the weight of an object to be measured.

Referring now to FIGS. 2 and 3, transducer 46 for generating a weight measurement signal is shown. Transducer 46 comprises an aluminum block or frame 50 and a cantilevered beam portion 52 which may be integrally formed with frame 50. Hook 12 is threaded into beam 52 by means of threaded portion 170. Disc 54 includes a threaded shaft portion 172 which is threadedly secured to beam 52 and may move freely in aperture 174 in frame 50. A lock nut 176 is also provided to lock shaft 172 in a fixed position. Thus, disc 54, which is made of a suitable metal such as aluminum, may be moved upwardly or downwardly to be in closer or further proximity to electrical coil 48 (see FIG. 3) whereby the apparent inductance of coil 48 is varied. In effect, by disposing disc 54 in the magnetic field of coil 48, eddy currents are generated in disc 54 which in turn generate a magnetic field which opposes the magnetic field generated by coil 48. The closer disc 54 is to coil 48, the greater will be the eddy currents generated in the disc, thus reducing the apparent inductance of coil 48 further. Thus, the apparent inductance of coil 48 is a function of the distance that disc 54 is spaced from the coil 48. The frequency of oscillator 44 is a function of the inverse square root of the effective inductance of coil 48 and the capacitance of capacitors 152 and 154. Thus, the functional relationship of the displacement of beam 52 with respect to frequency of the oscillator is a nonlinear curve. It is desired that the operating point of the weight measurement system is at a point on the curve where the slope of the curve is a given fixed value. Calibration of the oscillator to determine the operating point on the curve is made possible by the variable rest position of disc 54. Thus, the initial or rest position of disc 54 is first established and any further movement of disc 54 due to deflection of beam 52 is the result of the weight of an object to be measured. The amount of deflection of cantilevered beam 52 is very small, in the range of 0.030 inch.

Figure 5:
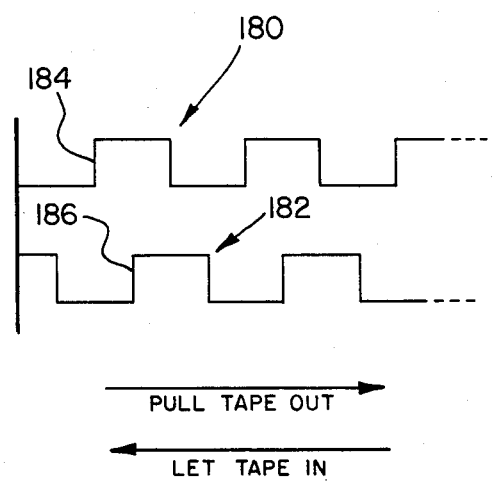
FIG. 5 is a representation of the wave forms generated by the length measurement transducer of the apparatus of FIG. 1.
Figure 6:
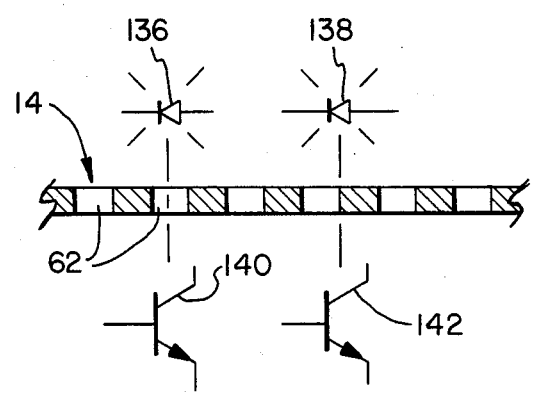
FIG. 6 is a schematic representation of the light emitting diodes, the tape, and the photocells for the length measurement transducer of the apparatus of FIG. 1.

Referring now to FIGS. 5 and 6, the operation of the length measurement transducer of the apparatus is as follows: Light from LED's 136 and 138 will penetrate apertures 62 and will respectively impinge upon photocells 140 and 142. The placement of the photocells 140, 142 and LED's 136, 138 is such that photocell 140 will generate a square wave electrical signal 180 and photocell 142 will generate a square wave electrical signal 182. Thus, the leading edges 184 of the square wave pulses of wave form 180 always lead the leading edges 186 of the square wave pulses of wave form 182 as tape 14 is pulled out. Similarly, as tape 14 is retracted, the leading edges 186 of the pulses of wave form 182 lead the leading edges 184 of the pulses of wave form 180. In this way, microprocessor 42 can detect whether tape 14 is being pulled out from reel 64 or is being retracted. The software stored in the ROM 68 will cause a counter in microprocessor 42 to be incremented if the tape 14 is being pulled out and to be decremented if the tape 14 is being retracted. Thus, the current count accumulated in the microprocessor counter indicates the length of an object to be measured. It should be noted that the counter of microprocessor 42 is always reset to zero when power is first applied to the apparatus. Thus, the measured length will be the change in the position of tape 14 from the time the apparatus is turned on.

Referring now to FIGS. 6a and 6b, a flow chart is shown for the operation of the computer program stored in ROM 68 for control of microprocessor 42. At the initialization of operation of the apparatus, the state of on/off switch 18 is checked. If the switch 18 is off, the power down mode is entered wherein most elements of the apparatus are not energized but wherein the memory remains energized. However, if the on/off switch 18 is in the on state, the unit will be powered up as explained hereinbefore. When the unit enters the power down mode, the unit turns itself off, however, sufficient time is still provided for the processor to run one more instruction and that instruction will be power down. Therefore, the ROM will not be turned off until the instruction "power down" has been read and executed. The unit also checks to see if the store/recall switch 20 has been pressed. If the store/recall switch 20 was depressed at the time that the unit was turned on, memory is cleared. If the store/recall switch 20 was depressed after the unit is turned on, memory will not be cleared. Instead, in that case, the unit will recall the values which are in memory unless those values are zero. Thus, in effect, the store/recall switch 20 performs the functions of either clearing memory if on/off switch 18 is also depressed or recalling what values are stored in memory if the store/recall switch 20 is depressed after the on/off switch 18 is depressed and if the values in the display 24 are zero. If the values in the display 24 are not zero, depressing the store/recall switch will cause those values to be stored.

If the store/recall switch 20 has not been depressed, the program waits for two seconds or some other suitable predetermined period of time to either read the calculated raw length measurement value or the calculated raw weight value, depending on whether the tape 14 has been pulled out. The reason for this wait or settling time is so that the oscillator 44 for providing weight indication frequency has an opportunity to stabilize before the zero point is read. It should also be noted that the zero or reference frequency of oscillator 44, for the weight determination, is always selected to be the frequency of oscillator 44 at the time the unit is powered up. Similarly, the computer program will take, as the zero point for determining the length of an object to be measured, the position of the tape when the unit is powered up. Thus, for instance, if the dimension from the gill of a fish to its tail is to be measured and tape 14 has been pulled out to the gill before the unit is powered up, then the unit will read the length from the initial point of the tape (the gill) to the point to which the tape is pulled out after the unit has been powered up (the tail). Thus, for both weight and length measurements, the unit always gives the difference in dimension between the power on time and the readout time.

The set mode is now entered in which the unit power is automatically turned off after an elapse of two minutes. This preserves battery power if the operator forgets to turn the unit off. If two minutes has not yet elapsed, the Do mode is entered. As can be seen, three possible modes are available in the Do mode, namely the normal or default mode, the store mode, and the recall mode. The normal mode is entered when the weight and length of an object are to be determined. The store and recall modes are entered when the store/recall switch 20 has been depressed. If display 24 contains zero values, the recall mode is entered. If the display 24 is other than zero, the store mode is entered.

In the normal mode, the unit checks to see if the tape flag is set, that is to say, if tape 14 has been pulled out. If tape 14 has not been pulled out, the weight of the object will be determined and the raw weight value will be calculated. If tape 14 has been pulled out, the unit determines the length of the object instead of its weight. After determination of either a raw weight value or a raw length value, the unit checks the English/metric switch 22 to see what mode has been selected. If the English unit mode has been selected, display 24 will show the measured values in English units. If the metric mode has been selected, display 24 will show the measured values in metric units. After the normal mode has been executed and the values have been displayed, the program loop starting with the set mode will repeat until two minutes of time have elapsed at which time the power down mode is entered.

If the store/recall switch 20 is depressed, the unit will go into the store mode and store the current values and, furthermore, stores the current tape flag. When store/recall switch 20 is depressed, the values in storage will be recalled if the display 24 has zero values. To exit from the store or recall mode, the on/off switch should be depressed to reset the unit.

The computer program stored in ROM 68 for operating the system is set forth in Appendix A attached to this application.

While this invention has been described as having a preferred embodiment, it will be understood that it is capable of further modification. This application is, therefore, intended to cover any variations or modifications of the invention, following the general principles thereof and including such departures from the present disclosure as come within the intended spirit and scope of the invention. Accordingly, the patent is not to be limited in scope and effect to the specific embodiment shown and described herein nor in any other way that is inconsistent to the extent to which the progress in the art has been advanced by the invention.

What is claimed is:

1. An electronic weighing scale including calibration means comprising:
   means for supporting an object to be weighted;
   deflecting means operatively associated with said supporting means for statically deflecting a distance which is proportional to the weight of the supported object;

an electrical coil mounted in proximity to said deflecting means;

electrical circuit means connected to said coil and operative for providing an oscillating electrical signal whose frequency varies as a function of the static deflection of said deflecting means; and calibration means operatively associated with said coil means and movable relative thereto for varying said oscillating electrical signal frequency as a function of the position of said calibration means relative to said coil.

2. The weighing scale of claim 1 wherein said deflecting means comprises metallic means and wherein said calibrating means comprises metallic means.

3. The weighing scale of claim 1 wherein said calibrating means comprises an aluminum disc.

4. The weighing scale of claim 1 wherein deflecting means comprises a cantilevered beam and wherein said calibrating means comprises an aluminum disc including a threaded portion adapted to be threadedly received in said cantilevered beam.

5. The weighing scale of claim 1 including means for converting said oscillating electrical signal to an electrical display signal proportional to the weight of the object to be weighed, and digital display means responsive to said electrical signal for displaying the weight of said object.

6. The weighing scale of claim 5 wherein said means for converting provides said electrical display signal as a function of the difference in the frequency of said oscillating electrical signal when power is first applied to said scale and the frequency of said oscillating electrical signal after an object to be weighed is supported on said supporting means.

* * * * *

UNITED STATES PATENT AND TRADEMARK OFFICE
CERTIFICATE OF CORRECTION

PATENT NO. : 4,718,507
DATED : January 12, 1988
INVENTOR(S) : Clyde W. Howlett

It is certified that error appears in the above-identified patent and that said Letters Patent is hereby corrected as shown below:

Col. 2, line 30, after "by" insert --means--;
Claim 1, Col. 10, line 66, change "weighted" to --weighed--.

Signed and Sealed this

Second Day of August, 1988

Attest:

DONALD J. QUIGG

*Attesting Officer*  *Commissioner of Patents and Trademarks*